Dec. 13, 1966     E. O. NEGAARD     3,291,100
BIRD FEEDER
Filed Sept. 23, 1965
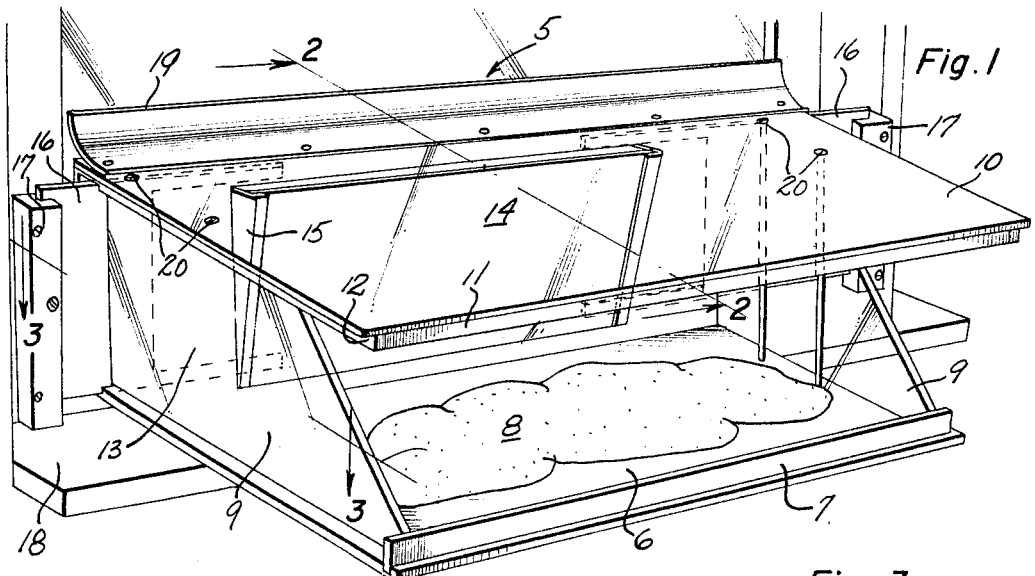
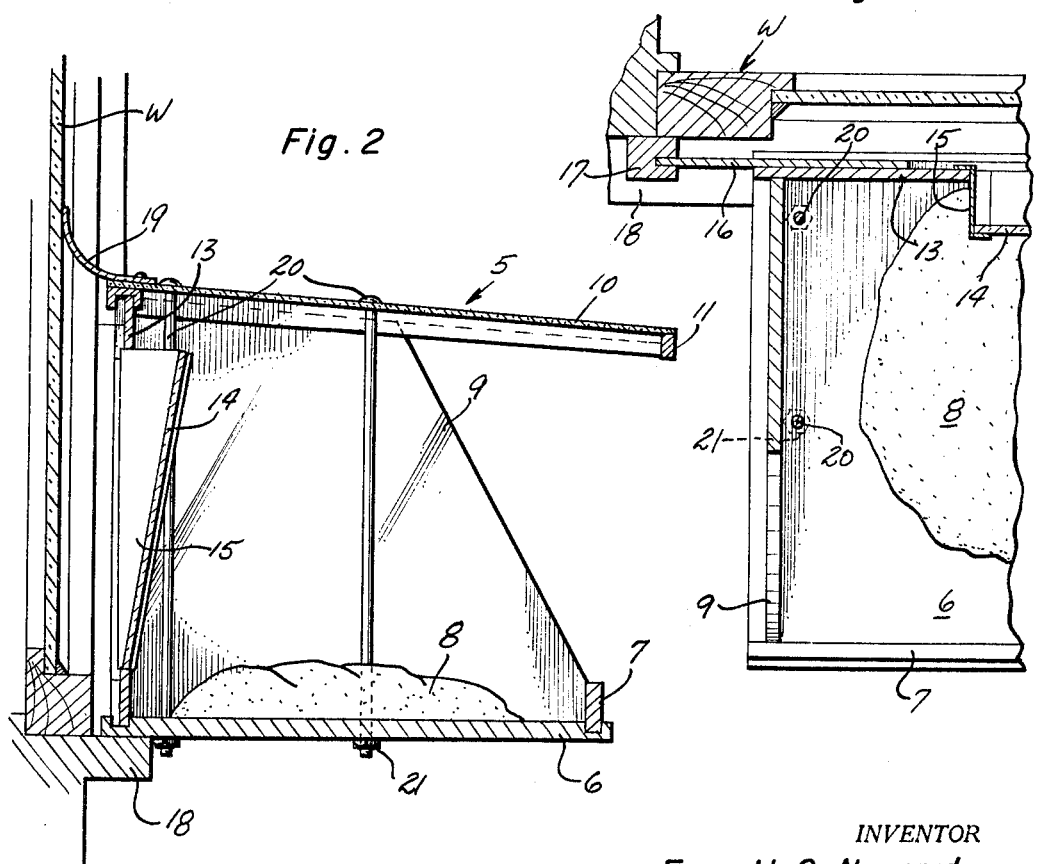
INVENTOR
*Everett O. Negaard*

3,291,100
BIRD FEEDER
Everett O. Negaard, 833 15th Ave. S., St. Cloud, Minn.
Filed Sept. 23, 1965, Ser. No. 489,616
1 Claim. (Cl. 119—51)

This invention relates to bird feeders, and more particularly to a bird feeder that is adpted to fit in the window of a building.

While there are an untold number of different types of bird feeders, an investigation will show that few, if any, will be found on the market that can be secured in the window of one's home.

It is a known fact that many people who like birds or want to make a study of them learn much just from watching them eat. This study can best be done when one is only a few inches away from the bird or birds, something that can only be done if the birds are unaware of one's presence. Admittedly, one can watch birds feed and the like through a telescope or binoculars although the results are usually far from being satisfactory.

It is, therefore, the principal object of this invention to provide a bird feeder that is specially made to fit in the window of a building in order that one may watch birds feed without the birds knowledge that the person or persons watching them are but a few inches away.

Another object of this invention is to provide a bird feeder that is so constructed that it will protect the food as well as the bird, or birds, from the elements.

Another object of this invention is to provide a bird feeder that can be manufactured and retailed at a price nearly every bird lover can afford.

Still another object of this invention is to provide a bird feeder that can be packaged in knock-down form for ease in shipment or storing when not in use.

Further objects and advantages of this invention of mine will become more readily apparent from the following description of the construction of the preferred embodiment thereof, as illustrated in the attached drawing, in which:

FIGURE 1 is a pictorial view of this invention in place in the window of a building.

FIG. 2 is a cross-sectional view of this invention taken substantially along line 2—2 of FIG. 1 and viewed in the direction indicated by the arrows.

FIG. 3 is a partial sectional view of this invention taken substantially along line 3—3 of FIG. 1 and viewed in the direction indicated by the arrows.

As shown in the drawing, the bird feeder 5 consists of a horizontally disposed rectangular bottom 6 having a vertically disposed board 7 or the like projecting upward along the entire outermost edge of the bottom 6 in order to prevent the bird food 8 from being accidentally pushed off the feeder as could otherwise easily happen. A transparent or translucent vertically disposed end member 9, having the configuration of a trapezoid, is mounted on each end of the aforesaid rectangular bottom 6 as clearly shown in FIGURES 1 and 2 of the drawing where it is also seen that the flat, horizontally disposed rectangular top 10 is made of the same material as the aforesaid end members 9 of this invention. The just-mentioned top 10 is naturally wider than the bottom 6 in order to provide additional protection for the bird food from the elements. A stiffening member 11 is secured to the underside of the outer longitudinal edge of the top 10 while an alike stiffener 12 is likewise secured to the underside of each end of the top as one can see by looking at the drawing. The back 13 of this invention of a bird feeder consists of a vertically disposed rectangular panel extending clear across the full length of the bird feeder. The back panel is provided with a centrally located rectangular opening in which is secured an inwardly inclined rectangular transparent mirror glass 14 that is also known as a one-way mirror. The mirror glass panel 14 is secured at each end by a triangular supporting member 15. A rectangular sliding panel member 16 is mounted at each end of the aforesaid panel 13 in order that this invention may be adapted to fit in nearly any window, which is indicated in the drawing by the capital letter W. It will be noted by examining FIGS. 2 and 3 of the drawing that this invention is actually mounted on the outside of the window W and that the outermost vertical edges of the two aforesaid panel members 16 are supported by being placed in a vertically disposed groove of the end post 17 that rises upward from the window sill 18. A piece of weatherstrip 19 or its equivalent is secured to the top surface and inward longitudinal edge of the aforesaid top 10 in order to prevent snow from getting between the window and the feeder.

It will be seen on examining FIGS. 1 and 2 of the drawing that the top 10 and the bottom 6 of this bird feeder 5 is held together by means of a pair of vertically disposed and spaced bolts 20 that extend downward near each end of the invention, and through both the aforesaid top 10 and the bottom 6. A nut 21 is screwed onto each bolt in order that the ends can be screwed onto the top 10 and the bottom 6, thereby firmly securing the two just-mentioned members together. The invention can also be made so that its assembly will not require the using of any bolts as will be understood by those experienced in the art. The feeder can also be assembled by using screws in the aforesaid end members 9 and screwing the members into the bottom 6 and the top 10 if it is so desired. This novel bird feeder can actually be mounted anywhere one may place it in a window. The invention is not to be limited to securement to the window sill.

While the specific details of construction of the preferred form of this novel invention have been herein described and illustrated by the drawing, it is to be understood that changes in the actual shape may vary in so long as the entire invention falls within the scope of the appended claim which is, of course, the limiting factor of this invention rather than the pictorial representation of the bird feeder.

What I now claim as new is:

A bird feeder of the character described, comprising a horizontally disposed rectangular bottom board that rests on the sill of the window of a building, and a rectangular board the same length as that of the said bottom board, the said rectangular board being secured in a vertical position to the upper and outer longitudinal edge of the said bottom board in order to prevent any bird food that is placed on top of the said bottom board from falling off the said bottom board, and a horizontally disposed rectangular top the same length as that of the said bottom board but of greater width than that of the said bottom board with the said top thereof extending outward beyond the outer edge of the said bottom board, the said top being held in equal and parallel spaced relation above the said bottom board by a trapezoidal shaped board-like member extending vertically upward from the upper surface of each end of the said bottom board and two spaced and parallel bolts extending downward through each end of the said top and the said bottom, and a nut screwed on the lowermost end of each one of the said bolts thereby firmly securing the said top to the said bottom, and a vertically disposed rectangular back secured to the inner longitudinal edge of the said top and said bottom of the said bird feeder, the said back having a rectangular opening in the center thereof, and an inclined rectangular transparent mirror glass covering the outward side of the opening and triangular shaped end members firmly securing the said mirror glass covering in place in the said bird feeder, and a rectangular vertically disposed sliding member secured to each end of the said back, the outer edge of each one of the two said sliding members being adapted to engage a vertically disposed end post that is secured to the outer surface of the said window in which the said bird feeder is mounted.

References Cited by the Examiner

UNITED STATES PATENTS

| D. 119,588 | 3/1940 | Hyde. | |
| 3,086,499 | 4/1963 | Dilley | 119—51 |
| 3,089,461 | 5/1963 | Dunn | 119—51 |

FOREIGN PATENTS

| 915,480 | 1/1963 | Great Britain. |

SAMUEL KOREN, *Primary Examiner.*

HUGH R. CHAMBLEE, *Examiner.*